United States Patent [19]

Conacher, Jr.

[11] 3,917,792

[45] Nov. 4, 1975

[54] ELASTOMERIC POLYURETHANE PARTS PRODUCED BY LIQUID INJECTION MOLDING

[75] Inventor: Philip Conacher, Jr., Wilmington, Del.

[73] Assignee: E. I. Du Pont de Nemours & Company, Wilmington, Del.

[22] Filed: Jan. 28, 1974

[21] Appl. No.: 436,950

Related U.S. Application Data

[63] Continuation-in-part of Ser. No. 365,979, June 1, 1973, abandoned.

[52] U.S. Cl. ............................ 264/328; 264/329
[51] Int. Cl.² .................................... B29F 1/06
[58] Field of Search ........................ 264/328, 329

[56] References Cited
UNITED STATES PATENTS

| | | | |
|---|---|---|---|
| 2,729,618 | 1/1956 | Muller | 264/DIG. 77 |
| 2,885,268 | 5/1959 | Breer | 264/329 X |
| 3,194,868 | 7/1965 | Shaw | 264/329 |
| 3,660,552 | 5/1972 | Hinz | 264/329 X |
| 3,755,261 | 8/1973 | Van Gulick | 260/77.5 AM |

Primary Examiner—Richard R. Kucia

[57] ABSTRACT

The instant invention relates to a method for producing a molded article by injecting, under elevated pressure, a fluid dispersion of 4,4'-methylene dianiline and a designated alkali metal salt complex in an isocyanatoterminated prepolymer or polymer, into a closed preheated mold which is maintained at a temperature of about 100°–195°C. The dispersion is injected at a rate sufficient that the mold filling is effected before gelation of the fluid dispersion and a thermoset polyurethane molding is removed in less than about 3 minutes after completion of the mold filling. The instant invention eliminates the need for a degassing step.

It is also intended to include a one-shot curing system in the instant invention. Briefly, the one-shot method involves simultaneously mixing and reacting one or more polyols, one or more polyisocyanates and the complex of 4,4'-methylene dianiline and salt.

8 Claims, No Drawings

ELASTOMERIC POLYURETHANE PARTS PRODUCED BY LIQUID INJECTION MOLDING

RELATED APPLICATIONS

The instant application is a continuation-in-part of U.S. Ser. No. 365,979 now abandoned, filed June 1, 1973, for Philip Conacher, Jr. entitled "Elastomeric Polyurethane Parts Produced By Liquid Injection Molding."

BACKGROUND OF THE INVENTION

The curing of amine-curable polymers, such as isocyanato-terminated polyurethane prepolymers is well known. In the past, curing has generally involved mixing the amine curing agent with the urethane prepolymer, or polymer intermediates in the case of a one-shot process, just prior to use by means suitable for the material involved and placing the mixture into a mold so that it may take on a useful form. The mold is then heated to complete the curing reaction. Traditionally, the mold has been filled by pouring the mixture of curing agent and the urethane prepolymer or polymer intermediates directly into the mold. Because of the high rate of reaction of isocyanato groups even with aromatic diamines, it has been necessary to employ hindered aromatic diamines, such as 4,4'-methylenebis(2-chloroaniline) and 3,3'-dichlorobenzidine. While these amines generally provide ample time for mixing and mold filling, they are so unreactive that relatively long times are required before demolding is possible. This prior art procedure also requires metering of at least two streams with the associated problem of surging and immediate flushing of the mixing head after use. During the curing operation, air, which is usually traceable to the polyol, or $CO_2$ which has been formed by the reaction of urethane prepolymer or polymer intermediates with water, or air which has been entrapped during the mixing of the curing agent with the prepolymer or polymer intermediates, tends to escape and form bubbles. This is, of course, highly undesirable since the air bubbles will be retained in the final cured polyurethane product and thereby affect its utility. In the past, a separate degassing step was utilized to remove the gas from the system. Such a degassing step has presented several disadvantages; initially, as a general rule, the degassing step failed to remove all of the gas and frequently bubbles were found within the polyurethane product. Additionally, the degassing operation required the use of facilities for degassing which were expensive. Typical equipment exposes the polyurethane-forming materials to a moderately strong vacuum at elevated temperatures with agitation.

Thus there is a need for an economical, efficient process for amine curing urethane prepolymers or urethane polymers characterized by increased processing safety and rapid demolding which further avoids the necessity of a separate degassing step.

SUMMARY OF THE INVENTION

According to this invention, it has unexpectedly been found that one may rapidly and efficiently mold amine-cured urethane prepolymer or polymer intermediates in the absence of a separate degassing step. The process will be discussed in terms of an isocyanato terminated prepolymer, but it is intended to include urethane polymers formed by the one-shot process.

The prepolymers to be treated according to the instant invention are formed by the reaction of polyether polyols or polyester polyols with a molar excess of an organic diisocyanate; the resulting prepolymer has terminal isocyanato groups. A curing agent is added to the prepolymer to form a fluid dispersion therein. The curing agent is a complex of 4,4'-methylene dianiline and a designated alkali metal salt, preferably lithium chloride or sodium chloride. The fluid dispersion has a finite pot life measured in hours at temperatures below about 80°C which allows for it to be metered to a mold as a single stream thus eliminating the problem of surging. The finite pot life also eliminates the need to flush the injection nozzle. The dispersion is injected at elevated pressure into the mold; pressure is such as to prevent entrained air or other gaseous material from escaping and forming bubbles in the fluid. The temperature in the mold is maintained at a sufficiently high level to break the complex and affect a rapid curing of the isocyanato-terminated prepolymer, 100°–195°C. Curing is effected within no more than about 3 minutes, preferably less than about 2 minutes. Because of this rapid curing, the pressure does not have to be maintained for a long period of time and therefore does not add great expense to the process. Surprisingly, it has been found that it is possible to load even large complex molds with the fluid dispersion before gelation prevents flow and still demold within less than about 3 minutes.

At the end of the set period, a molded thermoset polyurethane article is recovered which may be further cured if desired. When the one-shot procedure is used, one or more polyols, one or more polyisocyanates and the complex are simultaneously mixed and reacted. As soon as the mixture has been formed, it must be injected into the mold. The one-shot procedure is not preferred because it does not have the finite pot life of the prepolymer procedure.

DETAILED DESCRIPTION

In more detail, when forming the polyurethane by the prepolymer method, one must first react a polyether polyol (S) or polyester polyol (S) with a molar excess of an organic diisocyanate to form a prepolymer having terminal isocyanato groups. The prepolymer is then cured to increase its molecular weight from less than about 3000 to upwards of about 10,000. Examples of such prepolymers and their formation are to be found in U.S. Pat. Nos. 2,620,560; 2,777,831; 2,843,560; 2,866,774; 2,900,368; 2,929,800; 2,948,691; 2,948,707; 3,114,735 and 3,188,302; the disclosures of these patents are herein incorporated by reference. The preferred polyether or polyester polyols are as follows: polypropylene ether glycol, polytetramethylene ether glycol, poly (ethylene adipate) glycol, poly (ethylene/propylene adipate) glycol, poly (tetramethylene adipate) glycol and poly (caprolactone) glycol. Molecular weights of 500–3000 are generally preferred for the polyols.

The preferred organic diisocyanates are tolylene diisocyanate and 4,4'-methylenebis (phenyl isocyanate).

The polyol as received usually contains some entrained air which in the past tended to form bubbles during thermal curing.

Prior to the curing operation itself, mixing and/or milling of the urethane with finely divided particles of the complex is required. Typically, the complex particle size is 1–150 microns, preferably 1–10 microns.

Grinding the complex can be accomplished in standard grinding equipment such as the fluid energy mill and verticle hammer mills employing an air classification to remove ground material from the mill.

The curing agent is prepared by forming a complex between the 4,4'-methylene dianiline and a salt, the salt being selected from nitrites and halides, except the fluorides, of sodium and lithium and sodium cyanide. Specifically, the compositions to be utilized as curing agents for the urethane prepolymers or polymers include the reaction products of 4,4'-methylene dianiline with the following salts, in the ratio of 3 moles of methylene dianiline to 1 mole of salt: sodium chloride, sodium bromide, sodium iodide, sodium nitrite, lithium chloride, lithium bromide, lithium iodide, lithium nitrite and sodium cyanide.

Because of the availability and cost, the complexes derived from 4,4'-methylene dianiline and those in which the salt is sodium chloride or lithium chloride are especially preferred. The most preferred single complex is derived from 4,4'-methylene dianiline and sodium chloride.

There are a variety of methods for preparing the complexes of the instant invention.

In one method for preparing the complexes of this invention, an aqueous solution or brine containing a sodium or lithium salt selected from the class consisting of the chloride, bromide, iodide and nitrite is reacted with 4,4'-methylene dianiline (also referred to hereinafter as MDA), either in a solvent, having a degree of mutual solubility for both water and for the MDA, such as an alcohol, or with solid MDA in the substantial absence of a solvent. If the salt is present in relatively dilute concentration, for example between about 1% and about 12% by weight, a solvent for the MDA preferably is employed. If the salt is present in concentration above about 12 percent by weight, then no solvent need be employed, solid crystalline MDA being added directly to the salt solution.

A crystalline precipitate formed by interaction of the salt and the MDA is separated from the liquid phase, e.g., by filtration. The precipitate has a 3:1 mole ratio of MDA to salt and may be decomposed into its original constituents by adding a solvent such as acetone at an elevated temperature in the range of about 40° to 100°C., depending on the volatility of the solvent.

In the solvent method of preparing the complexes, a relatively dilute aqueous solution (1 to 12 percent by weight salt) of a sodium or lithium salt selected from the group comprising the chloride, bromide, iodide, and nitrite may be mixed with a solution of 4,4'-methylenedianiline in a suitable solvent, e.g., methanol, at a temperature in the range from about 20° to 60°C. Under these conditions, the MDA reacts with the sodium or lithium salt to form a crystalline precipitate consisting of MDA and the salt in a 3:1 mole ratio. The crystalline precipitate is then separated from the mother liquid by filtration, decantation, centrifuging or other suitable operation.

In the method of preparation in which a more concentrated salt solution (more than about 12 percent by weight of salt) may be employed, solid crystalline MDA is added to the salt solution with agitation at a somewhat higher temperature in the range of from about 50°C. to 90°C. in an amount somewhat in excess of the stoichiometric quantity required to react with that amount of salt which is present in excess of about 12 percent by weight. Under these conditions three mols of MDA react with one mol of salt to form a crystalline precipitate which may be separated from the remaining solution by filtration, decantation, centrifuging or other suitable operation.

Complexes of other salts, such as sodium nitrite may be formed by substantially the same procedures outlined for the sodium chloride complexes.

Mixing of the finely divided complex with liquid prepolymers can be accomplished in dough mixers, high-speed impeller mixers, paddle-type mixers and the like. For best results it is preferred that the mix found in the foregoing types of mixers be further mixed (or the complex dispersed) by use of a three-roll mill such as is used in paint and ink manufacture. Improved dispersions can also be prepared in colloid mills. These various types of mixers and mills are described in "The Encyclopedia of Chemical Process Equipment," W. J. Mead, Reinhold (1964).

The complex may also be used in the form of a dispersion in an inert carrier liquid which is compatible with the polyurethane. Suitable liquids include aromatic ester plasticizers such as dioctyl phthalate, aliphatic ester plasticizers such as tetra ethylene glycol di(2-ethyl hexoate) and highly aromatic hydrocarbon oils such as Dutrex 739 Oil a product of Shell Oil Co. The use of such dispersions simplifies metering and reduces the time and energy required for adequately blending the complex with the prepolymer.

In mixing the complex with fluid prepolymers or polymers the temperature must be kept below the decomposition point of the complex in order to avoid the possibility of premature curing. In the present process, the decomposition point of the complex is a function of the particular complex being used and the prepolymer or polymer in which the complex is dispersed. For isocyanato-terminated urethane prepolymers and the sodium chloride complex of methylene dianiline, mixing should be performed below 80°C and preferably below about 50°C.

There is no requirement for a degassing step since pressure is maintained over the material in the mold. Setting of the molding is completed so rapidly that the pressure need be maintained for a minimal length of time, e.g. less than about three minutes, preferably less than about 2 minutes.

The prepolymer is also injected into the mold under pressure. The injection can be accomplished by means of any conventional type injecting apparatus such as ram or screw injection molding equipment. Because of the relatively low pressures required mold filling can also be accomplished by means of pumps. The pressure must be sufficiently high to prevent the degassing of the prepolymer. Typically, a pressure of about 100–800 psi will be sufficient, preferably about 250–500 psi. Higher pressures can be used if desired and practical. The pressure may come from any conventional source.

The temperature to be utilized during the curing of the urethane polymer or prepolymer will be about 100°C–195°C, preferably about 165°–195°C. The higher temperatures are preferred because they accelerate the curing of the urethane polymer or prepolymer; however, the temperature must not be so high as to decompose the product.

Curing to an extent permitting demolding ordinarily takes less than about 3 minutes, preferably less than about two minutes and most preferably will take place within about 100 seconds.

At the end of this time the molded product is ejected or removed. The product is substantially bubble free with all of the air remaining dissolved within it. Because of the emphasis on a rapid curing cycle molded objects having thin walls preferably between about 2 and 5 millimeters thick are readily formed by the present process.

It is believed that the reactions which take place in the present curing process are identical to those which occur when free MDA is used as a curing agent by prior art curing procedures.

One shot preparation of polyurethanes for use in this invention involves simultaneous mixing and reacting of one or more polyols, one or more polyisocyanates and the MDA-salt complex. For convenience, the complex is preferably used in the form of a dispersion in an inert liquid carrier as described hereinbefore. As the reactions involved are quite exothermic and rapid, it is desirable to mix at the lowest possible temperature in a low hold-up mixer and to direct the resulting mixture under pressure directly to molds. In some instances it may be desirable to use a urethane-forming catalyst such as dibutyltin dilauerate to assist in balancing the reaction rate of urethane formation with the very rapid reaction of MDA and isocyanate. As previously indicated the one-shot procedure does not provide the finite pot life associated with the prepolymer procedure and would therefore normally not be preferred.

The following examples are illustrative of the present invention and therefore are not intended in any way as a limitation of the scope thereof. Parts and percents are by weight unless otherwise indicated.

EXAMPLE 1

An isocyanato-terminated polyurethane is prepared from 0.4 moles of polypropylene glycol of molecular weight 2,000, 0.6 moles of dipropylene glycol and 1.73 moles of toluene, 2,4-diisocyanate by means of any standard prepolymer preparation technique. The resultant product has an —NCO content of 5.2% by weight.

To the prepolymer maintained at a temperature of 70°C is added with agitation 95% of the stoichiometric amount required for complete reaction of the sodium chloride complex of methylene dianiline (MDA$_3$NaCl) dispersed in an equal amount by weight of dioctyl phthalate. At the time of addition, the MDA complex/DOP dispersion is at room temperature.

After thorough mixing, the material is injected (by means of an air driven double acting piston pump)* through an adaptive nozzle with a hand operated valve into a mold maintained at 177°C. The injection pressure is 300 psi. After 2 minutes dwell time in the mold, a thermoset polyurethane is removed and oven cured for 2 hours at 120°C.

* The pump utilized is an ARO Pump, Series 300 Model 630-239, with a 10:1 fluid pressure to air pressure.

The molded article is observed to be free from air entrapment.

EXAMPLE 2

An isocyanato-terminated polyurethane is prepared from 4.8 moles of polypropylene glycol of molecular weight 2025, 1.415 moles of polytetramethylene ether glycol of molecular weight 980, 3.25 moles of dipropylene glycol, 6.195 moles of glycerol and 31.034 moles of toluene 2,4 diisocyanate by means of any standard prepolymer preparation technique. The resultant product has an —NCO content of 6.33 percent by weight.

To the prepolymer maintained at a temperature of 70°C is added with agitation 95 percent of the stoichiometric amount required for complete reaction of the sodium chloride complex of methylene dianiline (MDA$_3$NaCl) dispersed in an equal amount by weight of dioctyl phthalate. At the time of addition, the MDA complex/DOP dispersion is at room temperature. After thorough mixing, the material is injected (by means of an air driven double acting piston pump as used in Example 1) through an adaptive nozzle with a hand operated valve into a mold maintained at 177°C. The injection pressure is 600 psi. After 2 minutes dwell time in the mold, the thermoset polyurethane is removed and oven cured for 2 hours at 120°C.

The molded article is observed to be free from air entrapment.

EXAMPLE 3

An isocyanato-terminated polyurethane is prepared from 1.0 mole of polypropylene glycol of molecular weight 2025 0.67 moles of polytetramethylene ether glycol having a molecular weight of 980, 0.84 moles of dipropylene glycol, 1.08 moles of glycerol and 6.44 moles of toluene 2,4 diisocyanate by means of any standard prepolymer preparation technique. The resultant product has an —NCO content of 6.0 percent by weight. To the prepolymer maintained at a temperature of 70°C is added with agitation 95 percent of the stoichiometric amount required for complete reaction of the sodium chloride complex of methylene dianiline (MDA$_3$NaCl) dispersed in an equal amount by weight of dioctyl phthalate. At the time of addition, the MDA complex/DOP dispersion is at room temperature.

After thorough mixing, the material is injected (by means of the air driven double acting piston pump used in Example 1) through an adaptive nozzle with a hand operated valve into a mold maintained at 177°C. The injection pressure is 600 psi. After 2 minutes dwell time in the mold, the thermoset polyurethane is removed and oven cured for 2 hours at 120°C.

The molded article is observed to be free from air entrapment.

I claim:

1. In a process wherein an NCO— terminated polyurethane prepolymer is cured by contact with a complex of 4,4'-methylene dianiline and a salt selected from the group consisting of sodium chloride, sodium bromide, sodium iodide, sodium nitrite, lithium chloride, lithium bromide, lithium iodide, lithium nitrite, and sodium cyanide; the ratio of the dianiline to the salt in the complex being 3 moles to 1 mole, said curing being conducted at a temperature of approximately 100° to 195°C., the improvement comprising injecting a flowable dispersion of said prepolymer into a closed, preheated mold, said dispersion containing entrapped air, applying a pressure to the mold contents sufficient to prevent the entrained gases from escaping from the mold, and recovering a bubble-free polyurethane casting.

2. The process of claim 1 wherein said pressure is between about 100–800 psi.

3. The process of claim 1 wherein said curing takes place in less than about 2 minutes.

4. The process of claim 1 wherein said complex is derived from 4,4'-methylene dianiline and sodium chloride.

5. The process of claim 1 wherein said complex is derived from 4,4'-methylene dianiline and lithium chloride.

6. The process of claim 5 wherein said curing takes place for a maximum period of about 100 seconds.

7. The process of claim 6 wherein said prepolymer is formed by reacting polytetramethylene ether glycol and tolylene diisocyanate.

8. A process for curing an NCO— terminated polyurethane prepolymer consisting essentially of injecting under pressure a fluid air-containing dispersion of the prepolymer and curing complex into a closed preheated mold, said complex being a complex of 4,4'-methylene dianiline and sodium chloride, the ratio of the dianiline to the sodium chloride in the complex being 3 moles to 1 mole, applying a pressure of about 100 to 800 psi to the mold contents, heating the mold contents to a temperature of about 100°–195°C. for a time sufficient to complete the reaction, and recovering a bubble-free polyurethane molding from the mold.

* * * * *